(12) United States Patent
Matsubara et al.

(10) Patent No.: US 6,425,838 B1
(45) Date of Patent: Jul. 30, 2002

(54) MOTOR/GENERATOR APPARATUS FOR MOTOR VEHICLE

(75) Inventors: Kenichirou Matsubara, Chiyoda; Yuzo Kadomukai, Ishioka; Toshiyuki Innami, Tsuchiura; Kou Ajima, Hitachioota, all of (JP)

(73) Assignees: Hitachi, Ltd., Tokyo; Hitachi Car Engineering Co., Ltd., Ibaraki, both of (JP)

( * ) Notice: Subject to any disclaimer, the term of this patent is extended or adjusted under 35 U.S.C. 154(b) by 0 days.

(21) Appl. No.: 09/626,789

(22) Filed: Jul. 26, 2000

(30) Foreign Application Priority Data

Sep. 20, 1999 (JP) ............................................. 11-265005

(51) Int. Cl.$^7$ ............................................. F02D 29/02
(52) U.S. Cl. ............................................. 475/5; 475/13
(58) Field of Search ............................ 475/5, 8, 12, 13

(56) References Cited

U.S. PATENT DOCUMENTS

| | | | | | |
|---|---|---|---|---|---|
| 1,975,047 | A | * | 9/1934 | Lansing | 475/13 |
| 3,270,207 | A | * | 8/1966 | Stockton | 475/13 |
| 5,418,400 | A | * | 5/1995 | Stockton | 475/13 |
| 5,735,770 | A | * | 4/1998 | Omote et al. | 475/5 |

* cited by examiner

*Primary Examiner*—Sherry Estremsky
(74) *Attorney, Agent, or Firm*—Antonelli, Terry, Stout & Kraus, LLP

(57) ABSTRACT

A motor/generator apparatus for a vehicle which includes an electric machine acting as a motor or as a generator and also includes a transmission for bi-directionally transmitting a driving force between the an electric machine and a crank shaft of an engine and which is arranged so that the direction of a rotary shaft of the transmission when the an electric machine functions as the motor is the same as that when the an electric machine functions as the generator.

12 Claims, 6 Drawing Sheets

MOTOR/GENERATOR APPARATUS FOR MOTOR VEHICLE

BACKGROUND OF THE INVENTION

The present invention relates to a motor/generator apparatus for a vehicle which can operate as a motor and a generator.

There is disclosed in JP-A-62-93435 a control system for an internal combustion engine having an AC machine which is also used as a starter motor which output is coupled to an output shaft of the engine. The AC machine is used as a motor or an alternator, whereby, at the time of starting a vehicle, an output driving force of the motor assists a smooth acceleration of the vehicle, while, at the time of decelerating or stopping the vehicle, a braking force is converted to electric power to store it in a battery.

This system includes a gear mechanism for engagement with a ring gear provided at an outer periphery of a flywheel of the internal combustion engine, a small gear provided coaxially with the output shaft of the AC machine for engagement with the gear mechanism, and an electromagnetic clutch for clamping the gear mechanism. In the engine start mode, the electromagnetic clutch is turned OFF so that the output shaft of the AC machine is coupled with the engine via the small gear and gear mechanism with a large reduction gear ratio, in which case the AC machine operates as a motor. When the engine is stopped, on the other hand, the electromagnetic clutch is turned ON so that the output shaft of the AC machine is coupled to the engine via the small gear and gear mechanism with a small reduction gear ratio, in which case the AC machine operates as a generator.

In the above prior art, when the engine starts, the rotary shaft of the AC machine is rotated in a direction opposite to the rotation direction of the small gear which forms a ring gear in planetary gears, it is considered, when the electromagnetic clutch is engaged, that the rotational speed of the engine abruptly decreases under the influence of a rotational inertia of the rotary shaft of the AC machine. Such a circumstance is not preferable from the viewpoint of purposes of improving the ride quality and stability of the vehicle.

SUMMARY OF THE INVENTION

It is therefore an object of the present invention to provide a motor/generator apparatus for a motor vehicle which can be driven in such a manner as to improve the riding comfort and stability of the vehicle.

In accordance with an aspect of the present invention, the above object is attained by a motor/generator apparatus for a vehicle which includes an electric machine acting as a motor or as a generator and also includes a transmission for bi-directionally transmitting a driving force between the electric machine and a crank shaft of an engine and which is arranged so that the direction of a rotary shaft of the transmission when the electric machine functions as the motor is the same as that when the electric machine functions as the generator.

Further, the motor/generator apparatus is arranged so that the rotational direction of a rotor when the electric machine operates as the motor is made the same as the rotational direction of an input/output shaft coupled to the crank shaft when the electric machine operates as the generator.

DESCRIPTION OF THE EMBODIMENTS

Explanation will be made as to an electric machine 1 for a motor vehicle in accordance with a first embodiment of the present invention, with reference to FIGS. 1 to 4, 5A and 5B.

Figure 1:
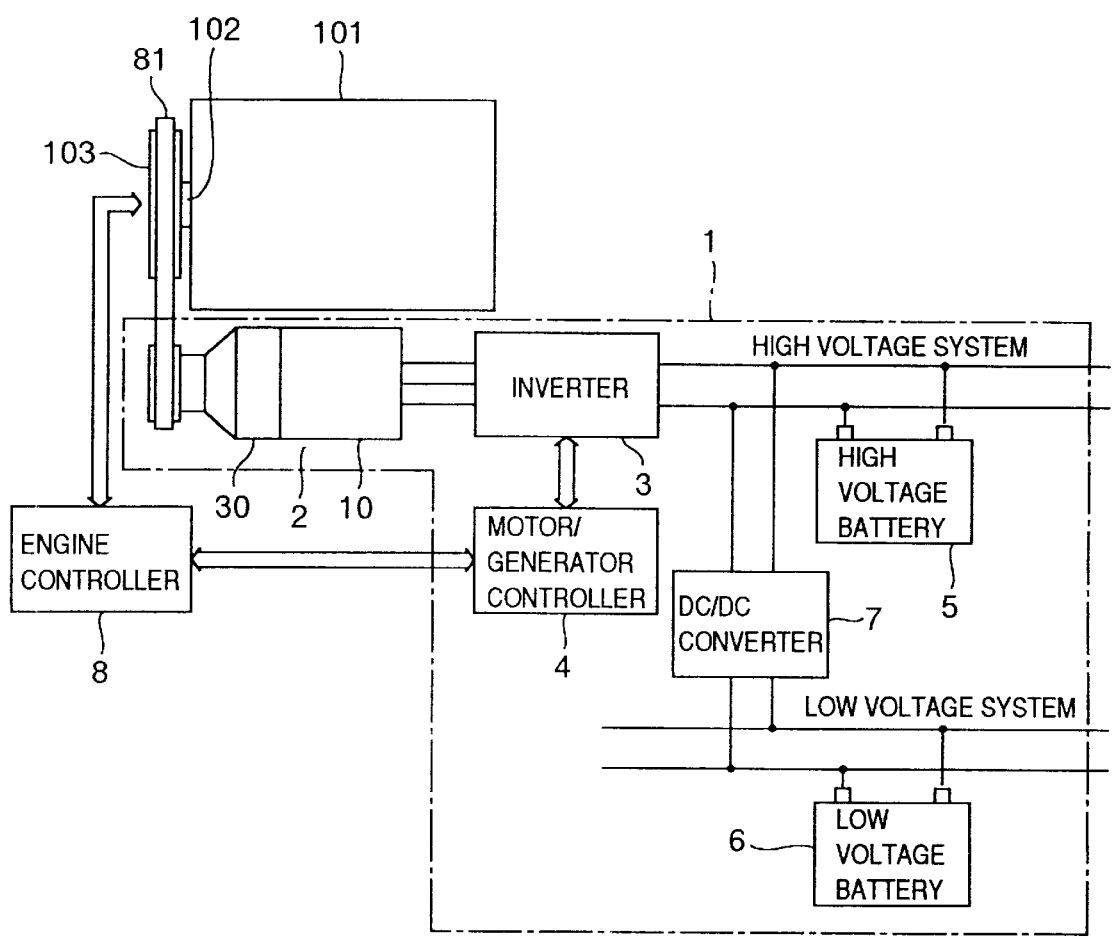
FIG. 1 shows an electric machine for a vehicle in accordance with a first embodiment of the present invention.

FIG. 1 shows an arrangement of the electric machine 1 of the present embodiment. The electric machine 1 of FIG. 1 includes a motor/generator 2 for bi-directionally transmitting a driving force to and from an engine 101, a high voltage battery 5 for performing charging and discharging operation for the motor/generator 2, an inverter 3 for performing power conversion between the motor/generator 2 and high voltage battery 5, a motor/generator controller 4 for controlling the motor/generator 2, a low voltage battery 6 for supplying a power to general electrical devices or equipment of the vehicle, and a DC/DC converter 7 for performing voltage conversion between high and low voltage sides. The motor/generator 2 has a transmission 30 which acts to perform speed changing operation based on a control command value received from the motor/generator controller 4.

Figure 2:
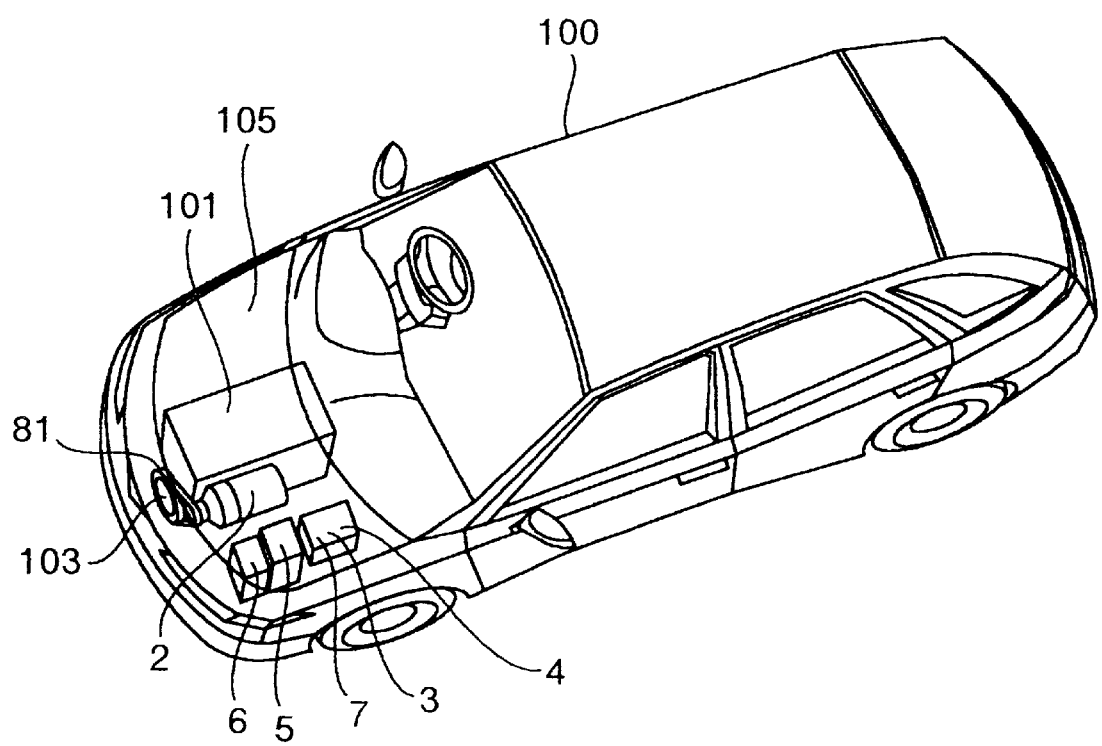
FIG. 2 is a perspective view of the electric machine of the present invention when mounted to a vehicle, showing its mounted condition.

FIG. 2 shows an example when the electric machine 1 is mounted on a vehicle 100. In FIG. 2, the motor/generator 2 is mounted by the side of an engine 101 side by side, and a belt 81 is passed between the engine 101 and a crank shaft pulley 103 to thereby transmit a driving force bi-directionally together with the engine 101. In this connection, the position of the motor/generator 2 can be suitably optimized according to the position of the engine 101, so that, even when the engine 101 is disposed laterally with respect to the vehicle 100, the motor/generator 2 can be mounted. Devices, instruments, etc. other than the motor/generator 2 are provided within an engine compartment 105. Even the positions of these devices can be suitably optimized according to the locations of devices associated with the vehicle, or these devices can be located outside the engine compartment 105.

Explanation will now be made as to the operation of the electric machine 1 when operated as a motor (which operation will be referred to merely as motor mode, hereinafter) and when operated as a generator (which operation will be referred to merely as generator mode, hereinafter). In the motor mode, A DC power of the high voltage battery 5 is converted by an inverter 3 to a suitable AC power so that the motor/generator 2 is rotated by the AC power to generate a driving force. The driving force is transmitted to a crank shaft 102 via the belt 81. In the generator mode, on the other hand, the driving force of the engine 101 is partially transmitted to the motor/generator 2 via the belt 81 to generate an AC power. The AC power is converted by the inverter 3 to a suitable DC power and then stored in the high voltage battery 5. The driving force of the engine 101 is further partially supplied to a low voltage side via the DC/DC converter 7 and then distributed to a vehicle electrical load and the low voltage battery 6.

In the present embodiment, a battery of about 42 V (volts) is used as the high voltage battery 5, and a battery of about 12–14 V lower than the voltage of the high voltage battery 5 as the low voltage battery 6.

The structure of the motor/generator 2 will be explained by referring to a vertical side cross-sectional view of FIG. 3.

In the present embodiment, the motor/generator 2 has a structure corresponding to a combination of the motor 10 and transmission 30. In this conjunction, the transmission 30 itself may be placed separately from the motor/generator 2. The transmission 30 includes an electromagnetic clutch 40 as a clutch device and a planetary gear mechanism (planetary gear device) 60. The motor 10 is integrally tightly coupled with the transmission 30 by means of, e.g., a through-bolt 90.

Explanation will first be made as to the structure of the motor 10. Generally speaking, the motor 10 is considered to be classified into two types, synchronous and induction. Since there is no a large difference in structure between the both types, explanation will be made herein only in connection with the latter as an example.

Fitted into an inside of a motor housing 11 of a generally cylindrical shape is a stator 12 which has a stator iron core 13 and a stator coil 14 wound therearound by engaging means such as shrinkage fitting or press fitting. Fitted into both ends of the motor housing 11 are front and rear brackets 15 and 16 having bearing holders 17a, 17b respectively. The motor housing 11 is integrally formed with a set of legs 18a, 18b which are to be engaged with an engine (not shown) mounting section 104 and fixed by means of a fixing bolt 91.

Positioned inside of the stator 12 is a rotor 19 a rotor iron core 21 of which is fitted by the aforementioned engaging means to a rotary shaft 20 at a position facing the stator iron core 13. And the rotor 19 is supported in the both brackets 15 and 16 by bearings 22a, 22b to be rotated inside of the stator 12. The rotor iron core 21 is made up of a plurality of thin steel sheets laminated and having a plurality of slots (not shown) therein, an aluminum alloy as an example being cast into the slots so that their both ends are short-circuited. As a result, a cage rotor inherent in an induction motor is completed.

Explanation will next be made as to the structure of the electromagnetic clutch 40 which forms a part of the transmission 30.

A core 41 wound by a coil 42 is fixed to the front bracket 15 through a mounting plate 43 coaxially with the motor 10 by means of a fixing bolt (not shown). A clutch rotor 44 is rotatably supported as spaced by a constant distance from the core 41, and the rotary shaft 20 extruding from the front bracket 15 is fitted into a center of the clutch rotor 44 by engaging means such as press fitting. An armature 45 is relatively rotatably supported as spaced by a constant distance from the clutch rotor 44, and a leaf spring 46 is fixed to an end face of the armature by a fixing volt (not shown).

Explanation will then be made as to the structure of the planetary gear mechanism (planetary gear device) 60 which forms a part of the transmission 30.

A ring gear 63 is engaged with an inside of a casing 65 relatively rotatably therewith, and a side plate 66 is fixed to an end face of the case by fixing bolts 93a, 93b. The side plate 66 is fixed to the armature 45 by the fixing bolts 93a, 93b via spacers 47a, 47b and fixing bolts 92a, 92b. With such an arrangement, the ring gear 63 and armature 45 can be rotated as a single unit.

A plurality of pinion gears (planet gears) 62a, 62b to be engaged with an inside of the ring gear 63 are suitably located inside of the ring gear and rotatably supported on an input/output shaft 64 as a planet carrier. A sun gear 61 is located insides of the pinion gears 62a, 62b to be meshed therewith in the vicinity of an end of the rotary shaft 20. With it, a set of such planetary gear mechanisms 60 are completed.

A roller bearing 68 is provided between a projection 67 of the casing 65 and the input/output shaft 64, and a one-way clutch 69 for restraining a rotation of the casing 64 in its one direction is provided between the casing 65 and a transmission housing 31.

The input/output shaft 64 is rotatably supported in the transmission housing 31 by means of a bearing 70, and fitted at its one end with a pulley 80, the pulley being fixed thereto by a fixing nut 94. The belt 81 is passed around the pulley 80 and a crank shaft pulley 103 (not shown). With such an arrangement, bi-directional transmission of a driving force to the crank shaft pulley 103 can be carried out. In this connection, when the pulley 80 and belt 81 are replaced by a sprocket and a chain belt, transmission of a larger driving force can be realized.

With the aforementioned arrangement, the input/output shaft 64, rotor 19 and crank shaft 102 can be rotated in the same direction.

Next the operation of the electric machine 1 will be explained below.

The operational mode of the motor/generator 2 is roughly classified into such modes as shown in Table 1.

TABLE 1

| Operational mode of motor/ generator | Operational state of motor/ generator | Reducing operation of planetary gear mechanism | Engagement of electro- magnetic clutch | Rotational ratio of rotary shaft to input/ output shaft |
|---|---|---|---|---|
| ① | Motor | With | Without | 1:u |
| ② | Motor | Without | With | 1:1 |
| ③ | Motor | Without | Without | Undefined |
| ④ | Generator | Without | With | 1:1 |
| ⑤ | Generator | Without | Without | Undefined |
| ⑥ | No drive | Without | Without | Undefined |
| ⑦ | No drive | Without | With | 1:1 |

The operational modes ⑥ and ⑦ denote a condition in which the crank shaft 102 is rotating and the rotor 19 receiving a slight driving force from the input/output shaft 64 is idling. In the Table 1, 'u' denotes a reduction gear ratio of the planetary gear mechanism 60 when it functions as reduction gears or a speed reducer, and is obtained by dividing the number of teeth in the ring gear 63 by the number of teeth in the sun gear 61 to obtain a divided value and adding 1 to the divided value.

For effectively driving the motor/generator 2, it is necessary to switch the operational mode to a suitable mode according to the characteristics of the motor/generator 2 and the running conditions of the vehicle 100. In addition, for avoiding losing of the riding comfort and stability of the vehicle 100, it is necessary to suitably switchingly change the engaged operation of the electromagnetic clutch 40 and the operation of the one-way clutch 69. Table 2 shows a typical switching pattern in the above case.

TABLE 2

| Switching pattern | Initial operational mode | Final operational mode |
|---|---|---|
| I | ① | ② |
| II | ① | ④ |
| III | ① | ⑦ |
| IV | ⑥ | ② |
| V | ⑥ | ④ |
| VI | ⑥ | ⑦ |
| VII | ② ④ ⑥ ⑦ | ① |

Explanation ill now be made as to the operation of the electric machine 1 in connection with examples of the switching patterns II, V and VII in the Table 2. Of course, the electric machine 1 of the present invention can have switching patterns other than the patterns given in Table 2.

A series of operations of the electric machine 1 in the switching pattern II will be explained below.

Explanation will be made in connection with an example wherein the engine starts and the motor/generator is shifted to function as a generator as the switching pattern II. The electric machine 1 has a function of temporarily stopping the engine 101 when the vehicle stops at a traffic stop signal light or an intersection before turning. This is intended to eliminate unnecessary fuel consumption in the engine idling condition to improve its fuel economy. When the driver wants to restart the vehicle 100 from the temporarily stopped condition, it is required that driver's starting operation cause the engine 101 to quickly start and start the vehicle 100. To this end, the rotational speed of the engine 101 must be increased to about 700 1000 rpm in very short time at least 1 second or less. In this example, generation is started immediately after such engine start is carried out.

Explanation will be made as to the engine starting operation (operational mode ①).

In FIG. 1, the motor/generator controller 4 judges permission or non-permission of the operation of the motor/generator 2 on the basis of sensor information received from an engine controller 8 and information about a charged quantity, etc. of the high voltage battery 5, and when judging that the operation of the motor/generator 2 is possible, outputs a three-phase AC command value to the inverter 3 to start the engine. In response to it, the inverter 3 in turn converts a DC power of the high voltage battery 5 to a suitable three-phase AC power and then outputs it to the motor/generator 2.

Figure 3:
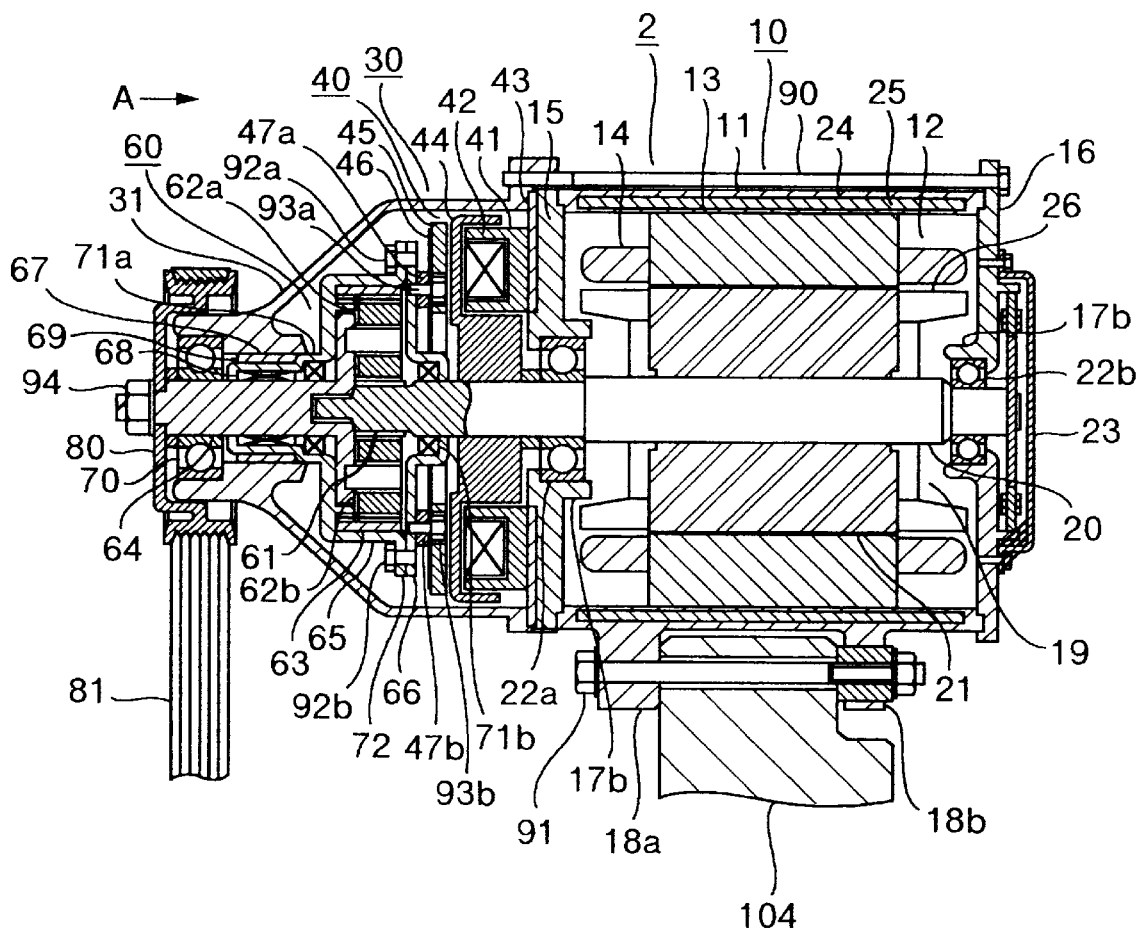
FIG. 3 is a vertical side cross-sectional view of a motor/generator which forms a part of the electric machine of the present invention.

In FIG. 3, when a three-phase AC voltage is applied to the motor/generator 2 or more specifically to The motor 10, this causes generation of a rotating magnetic field inside of the stator 12, whereby the rotor 19 rotates in its forward direction (counterclockwise as viewed from an arrow A in the drawing) with a desired performance. The rotation of the rotor 19 causes rotation of the sun gear 61 provided in the vicinity of an end of the rotary shaft 20 and also rotation of the pinion gears 62a and 62b meshing with the sun gear. At this time, the ring gear 63 undergoes a rotational energization force in the opposite direction. However, since the casing 65 engaged with the ring gear 63 is locked to the transmission housing 31 due to the operation of the one-way clutch 69, the planetary gear mechanism 60 functions as a speed retarder, thus resulting in that the driving force of the rotary shaft 20 is decreased and transmitted to the input/output shaft 64. The then reduction gear ratio is a value obtained by dividing the number of teeth of the ring gear 63 by the number of teeth of the sun gear 61 to obtain a divided result and adding 1 to the result. The driving force transmitted to the input/output shaft 64 is then transmitted to the crank shaft 102 (not shown) via the pulley 80 and belt 81, thus starting the engine 101.

After the engine starting operation (operational mode ①) is completed, the mode is shifted to the generator mode (operational mode ④). In the present embodiment, prior to the shift to the mode ④, the motor/generator 2 is driven in the operational mode ⑤. In the operational mode ⑤, the motor/generator 2 operates as a generator, but due to the inherent characteristic of the planetary gear mechanism 60, the motor/generator 2 will have no influence on the input/output shaft 64 or crank shaft 102 as a load.

In the operational mode ⑤, the motor/generator controller 4 outputs a three-phase AC command value to the inverter 3 to drive the motor/generator 2 as a generator. In response to it, the inverter 3 converts a DC power of the high voltage battery 5 to a three-phase AC power and then outputs it to the motor/generator 2.

When the above three-phase AC voltage is applied to the motor/generator 2 or more specifically to the motor 10, this causes generation of a rotating magnetic field inside of the stator 12. In response to it, the rotor 19 in turn continuously rotates in such a manner that the rotational speed of the rotor approaches that of the input/output shaft 64. At this time, since the ring gear 63 also continuously rotates in such a manner that the rotational speed of the ring gear 63 approaches that of the input/output shaft 64 due to the inherent characteristic of the planetary gear mechanism 60, it can be avoided that the above operation causes hindrance of the rotation of the input/output shaft 64 or crank shaft 102. And at the stage that the rotational speeds of the rotor 19, input/output shaft 64 and ring gear 63 become nearly the same and the angular accelerations of the three rotations become nearly the same desirably in addition to the rotational speed, the mode is shifted to the operational mode ④ (generator mode).

Even in the operational mode ④, the motor/generator 2 is continuously driven as the generator. However, since it is required to operate the electromagnetic clutch 40, the motor/generator controller 4, simultaneously with the shift, outputs a signal to a power supply (not shown) provided within the inverter 3 to actuate the electromagnetic clutch 40. In response to it, the power supply in turn converts the DC power of the high voltage battery 5 to a suitable power and then outputs it to the electromagnetic clutch 40.

In FIG. 3, when a power is supplied to the electromagnetic clutch 40 to supply a current to the coil 42, an electromagnetic force is generated so that the a, armature 45 is attracted to the clutch rotor 44 against the spring force of the leaf spring 46 and the both can move as a single unit. As a result, the sun gear 61 provided in the vicinity of one end of the rotary shaft 20 fitted into the center of the clutch rotor 44 is engaged with the ring gear 63 engaged with the inside of the casing 65 fixed to the armature 45. As a result, the planetary gear mechanism 60 cannot function as the speed retarder due to its inherent characteristic and thus the driving force of the input/output shaft 64 will be transmitted to the rotary shaft 20 as it is. For the purpose of preventing the planetary gear mechanism 60 from functioning as the speed retarder, it is only required to connect at least two of three shafts in the mechanism. In this connection, however, any combination other than the above may be employed according to the interior arrangement of the transmission 30. Further, the electromagnetic clutch 40 may have such a structure that the armature 45 is formed integrally with the clutch rotor 44 by stopping the supply of the current to the coil 42.

Figure 4A:
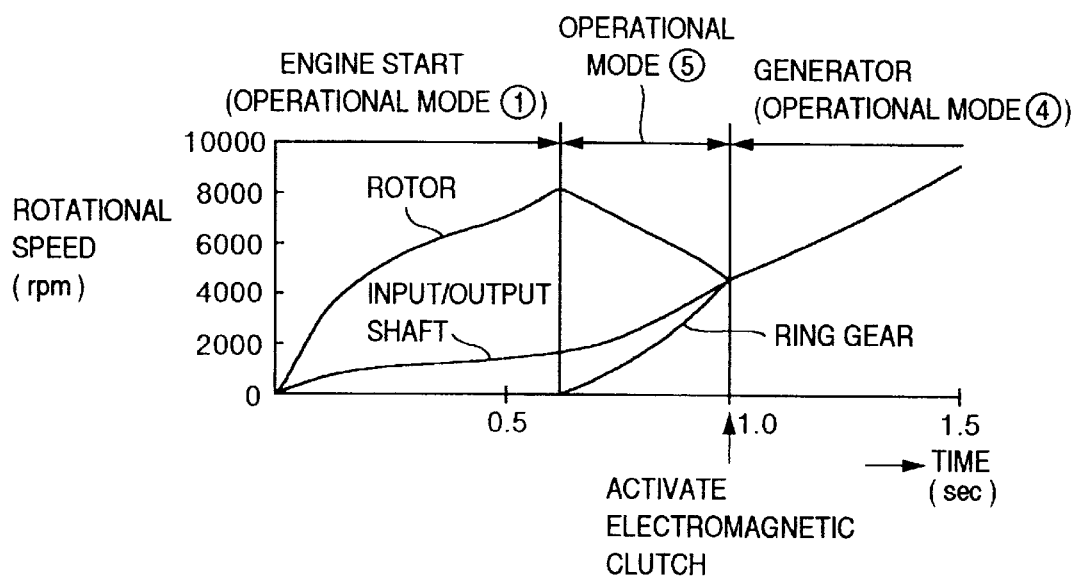
FIG. 4A is a timing chart of rotational speed of the electric machine when operated.
Figure 4B:
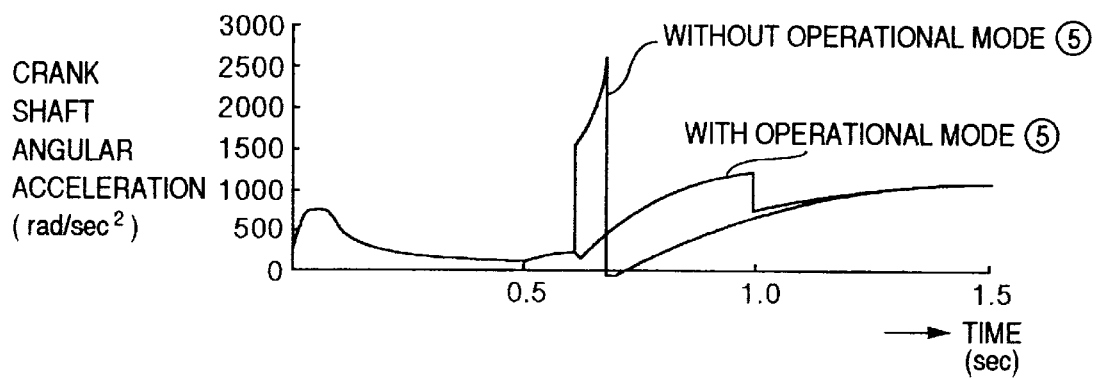
FIG. 4B is a timing chart of angular acceleration of a crank shaft in the electric machine of the invention when operated.

Shown in FIG. 4A is an example of a timing chart of rotational speed in a series of the aforementioned operations. It will be seen from the drawing that, when the rotational speeds of the rotor 19 and ring gear 63 are different from the rotational speed of the input/output shaft 64 even after completion of the engine starting mode (operational mode ①), the rotational speeds of these three rotations can be made nearly the same by driving the motor/generator 2 in the operational mode ① (which will be referred to as 'with the operational mode ⑤', hereinafter) prior to the shift to the operational mode ④. An angular acceleration of the crank shaft 102 at this time in comparison with a case wherein the operational mode ⑤ is absent (which will be referred to as 'without the operational mode ⑤') is shown in FIG. 4B. It will be appreciated from the drawings that, in the case of the 'with the operational mode ⑤', the electromagnetic clutch 40 is actuated to shift the mode to the operational mode ④ (generator mode) in such a condition that the rotational speeds of these three rotations are substantially the same, whereby the clutch can have substantially no influence of rotational inertia of the rotor 19 and ring gear 63 and thus the angular acceleration of the crank shaft 102 can be suppressed to a relatively small level.

A large change in the angular acceleration of the crank shaft 102 or in the rotational speed of the engine 101 not only causes deterioration of riding quality of the vehicle 100 but also leads to a deteriorated stability of the vehicle. For this reason, it is desirable to minimize such a change. In this respect, it is considered that the electric machine 1 of the present embodiment is valid for securing the improved riding comfort and stability of the vehicle 100.

As will be further seen from FIGS. 4A and 4B, in the present embodiment, since the rotor 19, input/output shaft 64 and ring gear 63 are rotated always in the same direction in all the modes of from the engine starting mode to the generator mode, the influence of the motor/generator 2 on the engine rotational speed at time of the mode change can be minimized.

Further, since the operation of the electric machine 1 in the switching pattern I is the same as that of the switching pattern II except that the motor/generator 2 is driven as a motor after the switching, the electric machine 1 of the present embodiment is considered even in the switching pattern I to be valid for securing the ride quality and stability of the vehicle 100.

Furthermore, since the operation of the electric machine 1 in the switching pattern III is the same as that of the switching pattern II except that the motor/generator 2 is not driven after the switching, the electric machine 1 of the present embodiment is considered even in the switching pattern III to be valid for securing the ride quality and stability of the vehicle 100.

As has been mentioned above, it is necessary in this example to increase the rotational speed of the engine 101 to about 700–1000 rpm in very short time as at least 1 second or less at the time of starting the engine. This requires a relatively large driving force or torque to energize and rotate the crank shaft 102. The speed reducing operation of the planetary gear mechanism 60 enables the torque of the rotary shaft 20 to be multiplied by the number of reduction gear ratio or pulley ratio, so that a torque required to be generated by the motor 10 can be made small by the corresponding amount, and thus the motor 10 can be made small in size and weight. For example, when the planetary gear mechanism 60 has a reduction gear ratio of 5 and has a pulley ratio of 2, an overall reduction gear ratio becomes 10 corresponding to a product of the both ratios and it is only required for a torque to be ¹/₁₀ of a torque necessary for starting the engine. However, since it is necessary to increase the rotational speed of the motor 10 by a desired reduction amount and in this example, up to 7,000–10,000 rpm, it is required to output the torque stably in a relatively wide rotational speed range. In other words, the reduction gear ratio of the planetary gear mechanism 60 can be arbitrarily selected in an allowable range according to the torque characteristics of the motor 10.

As another example, there is considered a case here the temperature of the engine 101 is relatively high as after the engine is warmed up or run. In this case, a torque necessary for energizing and rotating the crank shaft 102 becomes extremely small, for which reason it becomes unnecessary to the planetary gear mechanism 60 to function as a speed retarder. Accordingly, in this case, such a switching pattern as to start the engine 101 in the operational mode ② and thereafter to switch the mode to the operational mode ④ is desirable. As a result, a time necessary for the engine start can advantageously be shortened and a power consumed by the motor 10 can advantageously be suppressed to a low level.

Explanation will now be made as to a series of operations of the electric machine 1 in the switching pattern V.

Upon switching the mode from the operational mode ⑥ to the operational mode ④, the motor/generator controller 4 judges the permission or non-permission of operation of the motor/generator 2 on the basis of the sensor information received from the engine controller 8 and the information about a charged quantity, etc. of the high voltage battery 5, and when judging the permitted operation, compares the rotational speed of the rotor 19 with a value obtained by multiplying the rotational speed of the engine 101 by the pulley ratio, i.e., with the rotational speed of the input/output shaft 64.

Thereafter the mode will be switched to the operational mode ④. In the present embodiment, when the rotational speed of the rotor 19 is higher than that of the input/output shaft 64 prior to the mode switching, the motor/generator 2 is driven in the operational mode ⑤. On the contrary, when the rotational speed of the rotor 19 is lower than that of the input/output shaft 64, the motor/generator 2 is driven in the operational mode ③.

In the operational mode ⑤ or ③, the electric machine 1 outputs a three-phase AC command value to the inverter 3 to drive the motor/generator 2 as a generator or motor. In response to it, the inverter 3 in turn converts the DC power of the high voltage battery 5 to a three-phase AC power and then outputs it to the motor/generator 2.

Application of a three-phase AC voltage to the motor/generator 2 or more particularly to the motor 10 causes generation of a rotating magnetic field inside of the stator 12, whereby the rotor 19 is continuously rotated so that the rotational speed of the rotor approaches that of the input/output shaft 64. At this time, by virtue of the inherent characteristic of the planetary gear mechanism 60, the ring gear 63 is also continuously rotated so that the rotational speed of the ring gear approaches that of the input/output shaft 64. Thus it can be avoided that the above operation causes hindrance of rotation of the input/output shaft 64 or crank shaft 102. At the stage that the rotational speeds of the rotor 19, input/output shaft 64 and ring gear 63 are made substantially the same and desirably the angular accelerations of these three rotations are made substantially the same in addition to the rotational speed, the mode is shifted to the operational mode ④. The operation of the operational mode ④ is as explained in connection with the switching pattern II and thus explanation thereof is omitted.

Figure 5A:
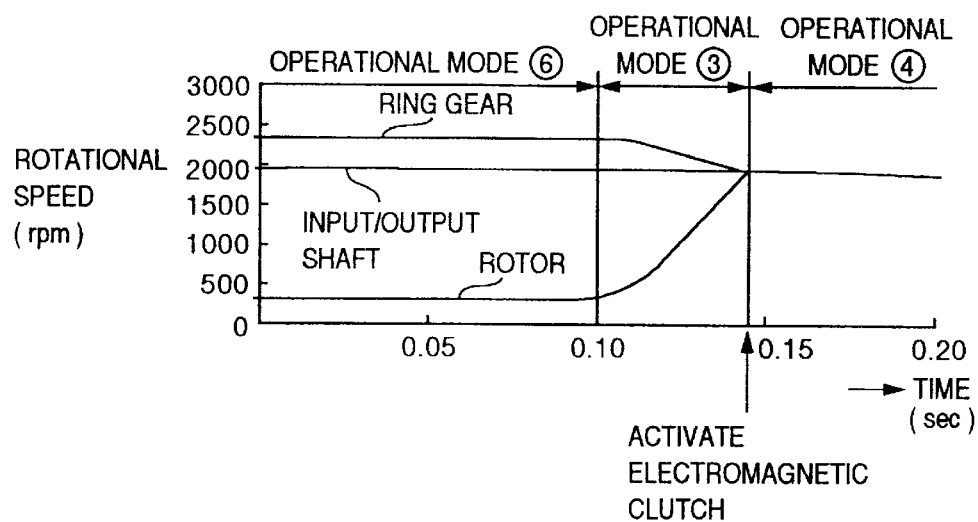
FIG. 5A is a timing chart of rotational speed of the electric machine when operated.
Figure 5B:
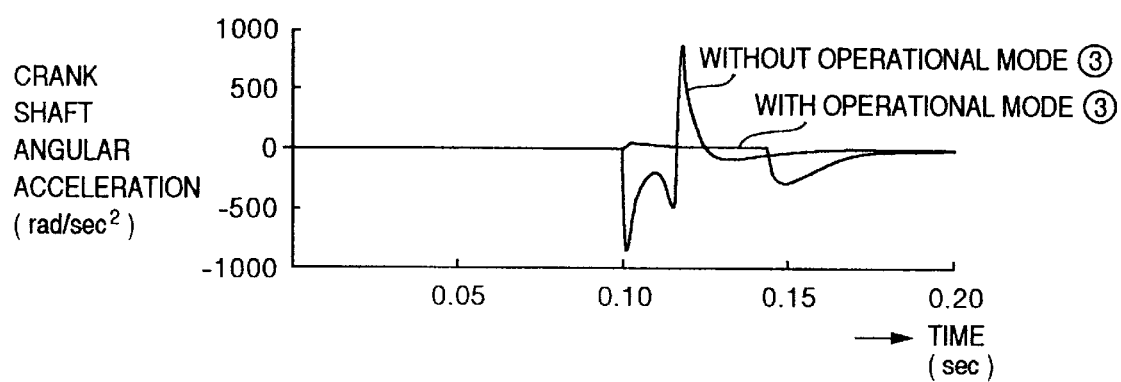
FIG. 5B is a timing chart of angular acceleration of the crank shaft in the electric machine when operated.

An example of a timing chart of rotational speed in the aforementioned series of operations when the rotational speed of the rotor 19 is lower than that of the input/output shaft 64 is shown in FIG. 5A. It will be noted from the drawing that, even when the rotational speeds of the rotor 19 and ring gear 63 are different from the rotational speed of the input/output shaft 64 in the operational mode ⑥, the rotational speeds of these three can be made substantially the same by driving the motor/generator 2 in the operational mode ③ prior to switching to the operational mode ④ (which will be referred to as "with the operational mode ③", hereinafter). An angular acceleration of the crank shaft 102 at this time is shown in FIG. 5B in comparison of a case when the operational mode ③ is absent (which will be referred to as 'without the operational mode ③, hereinafter'. It will be appreciated from the drawing that, in the case of the 'with the operational mode ③', the electromagnetic clutch 40 is actuated to shift the mode to the operational mode ④ in such a condition that these three rotational speeds are made to substantially coincide with each other, the clutch will have substantially no influence of rotational inertia of the rotor 19 and ring gear 63 and thus the angular acceleration of the crank shaft 102 can be suppressed to a relatively small value.

A large change in the angular acceleration of the crank shaft 102, that is, in the rotational speed of the engine 101 not only causes deterioration of the riding comfort of the vehicle 100 but also leads to a deterioration in the stability of the vehicle. Thus, it is desirable to minimize such a change. In this respect, the electric machine 1 of the present embodiment is considered to be valid for securing the improved riding comfort and stability of the vehicle 100.

Since the operation of the electric machine 1 in the switching pattern IV is the same as the switching pattern V except that the motor/generator 2 is driven as a motor after switching, the electric machine 1 of the present embodiment is considered to be valid for securing the improved riding comfort and stability of the vehicle 100 even in the switching pattern IV.

Further, since the operation of the electric machine 1 in the switching pattern VI is the same as the switching pattern V except that the motor/generator 2 is not driven after switching, the electric machine 1 of the present embodiment is considered to be valid for securing the improved riding comfort and stability of the vehicle 100 even in the switching pattern VI.

Explanation will be now be made as to a series of operations of the electric machine 1 in the switching pattern VII.

In order to switch the mode to the operational mode ① in such a condition that the 102 is rotating and the input/output shaft 64 receiving a slight driving force therefrom is rotating, it is necessary to increase the rotational speed of the rotor 19 to at least a value obtained by multiplying the rotational speed of the input/output shaft 64 by a reduction gear ratio 'u'. This is from the necessity of actuation of the one-way clutch 69 to lock the casing 65 engaged with the ring gear 63, whereby the planetary gear mechanism 60 functions as a an speed reducer, the driving force of the rotary shaft 20 is decreased and then transmitted to the input/output shaft 64.

Thus, in the switching pattern VII, prior to switching to the operational mode ①, it is required to optimize the operation of stopping the ring gear 63 rotating in its forward direction, i.e., the casing 65 to activate the one-way clutch 69, thus resulting in that the operation of the one-way clutch 69 can be made smooth and the angular acceleration of the crank shaft 102 can be suppressed to a small value.

Upon switching from one operational mode to the operational mode ①, the motor/generator controller 4 judges permission or non-permission of the operation of the motor/generator 2 on the basis of the sensor information received from the engine controller 8 and the information about a charged quantity, etc. of the high voltage battery 5, and when judging the permitted operation of the motor/generator, detects a rotational speed of the rotor 19.

Thereafter the mode is switched to the operational mode ①, but it is required, in the switching pattern VII, to drive the motor/generator 2 necessarily in the operational mode ③ prior to the mode switching.

In the operational mode ③, the motor/generator controller 4 issues a three-phase AC command value to the inverter 3 to drive the motor/generator 2 as a motor. In response to it, the inverter 3 in turn converts the DC power of the high voltage battery 5 to a three-phase AC power and then sends it to the motor/generator 2.

Application of a three-phase AC voltage to the motor/generator 2 or more particularly to the motor 10 causes generation of a rotating magnetic field inside of the stator 12, whereby the rotor 19 is continuously rotated to increase its rotational speed up to a value (which will be referred to as the target rotational speed, hereinafter) obtained by multiplying the rotational speed of the input/output shaft 64 by the reduction gear ratio "u". At this time, by inherent characteristic of the planetary gear mechanism 60, since the ring gear 63 is continuously rotated to decrease its rotational speed to zero, it can be avoided that the above operation causes hindrance of the operation of the input/output shaft 64 or crank shaft 102.

In the operational mode ③, since the motor/generator controller 4 controls the motor 10 in such a manner as to make small a deviation of the rotational speed of the rotor 19 from the target rotational speed, the rotation of the ring gear 63 can be stopped relatively smoothly or its rotational speed can be made to approach zero.

And when the operational mode ③ is completed, the mode is switched to the operational mode ①. The operation of the operational mode ① is substantially the same as that already explained in connection with the switching pattern II and thus explanation thereof is omitted.

Through the above operation, the operation of the one-way clutch 69 in the operational mode ① can be smoothly carried out and the angular acceleration of the crank shaft 102 can be suppressed to a small level.

Complementary explanation will be made as to the operational mode of the motor/generator 2.

In the operational mode ②, the rotation of the engine 101 can be energized by the driving force of the motor 10 in the running mode of the vehicle 100. Since this produces a larger total driving force, the acceleration performance of the vehicle 100 can be improved. Further, since a driving force to be generated by the engine 101 can be suppressed to a small value by an amount corresponding to the driving force obtained by the motor 10, the engine 101 can be made small in size and weight. Furthermore, since the driving force of the engine 101 can be controlled at high speed by the driving force of the motor 10, a relatively high effect can be obtained, for example, through torque-down control, reduction control of torque ripple of the engine, etc. in a vehicle with an automatic transmission.

In the operational mode ④, the electromagnetic clutch 40 is actuated and thus the planetary gear mechanism 60 is not used for the purpose of functioning it as a speed retarder and the driving force of the input/output shaft 64 is transmitted to the rotary shaft 20 as it is. For this reason, the rotational speed of the rotor 19 can be suppressed to a relatively low value obtained by multiplying the rotational speed of the crank shaft 102 by the pulley ratio, thus enabling acquisition of a stable electric power generation.

In the operational modes ② and ④, their transmission routes of their driving forces are the same and thus the both modes can be instantaneously switched during running of the vehicle 100.

Explanation will next be made below as to lubrication of the planetary gear mechanism 60. Lubricating oil is sealed within an inside of the planetary gear mechanism 60, that is, in a space closed by the casing 65, side plate 66, two ring-shaped seals 71a, 71b and seal 72, whereby proper lubrication can be realized.

Explanation will be made as to how to cool the motor 10. In FIG. 3, a coolant flow path 24 is formed inside of a wall of the motor housing 11, which space is filled with coolant 25. The coolant flow path 24 is connected to a radiator (not shown) externally installed so that a coolant pump (not shown) causes circulation of the coolant 25. With such an arrangement, heat generated by the stator coil 14 and rotor 19 is transmitted to the coolant 25 via the bearings 22a, 22b, brackets 15, 16 and motor housing 11 and absorbed therein, which results in that the temperature of the motor 10 can be kept substantially constant and a stable output can be obtained at all times.

When the motor housing 11 is molded by die casting, the coolant flow path 24 can be integrally formed while eliminating the need for machining it.

Further, the rotor iron core 21 is provided at its both ends with cooling fans 26 so that the rotation of the rotor 19 causes air turbulence within the motor 10, thus contributing to a further improvement in the cooling performance.

When it is required for the inverter 3, motor/generator controller 4, etc. to be subjected to forced cooling, coolant flow paths are formed around these devices as in the motor 10 and the radiator and coolant pump are operated for cooling.

Explanation will be made as to a second embodiment of the electric machine 1 in accordance with the present invention by referring to FIG. 6.

Figure 6:
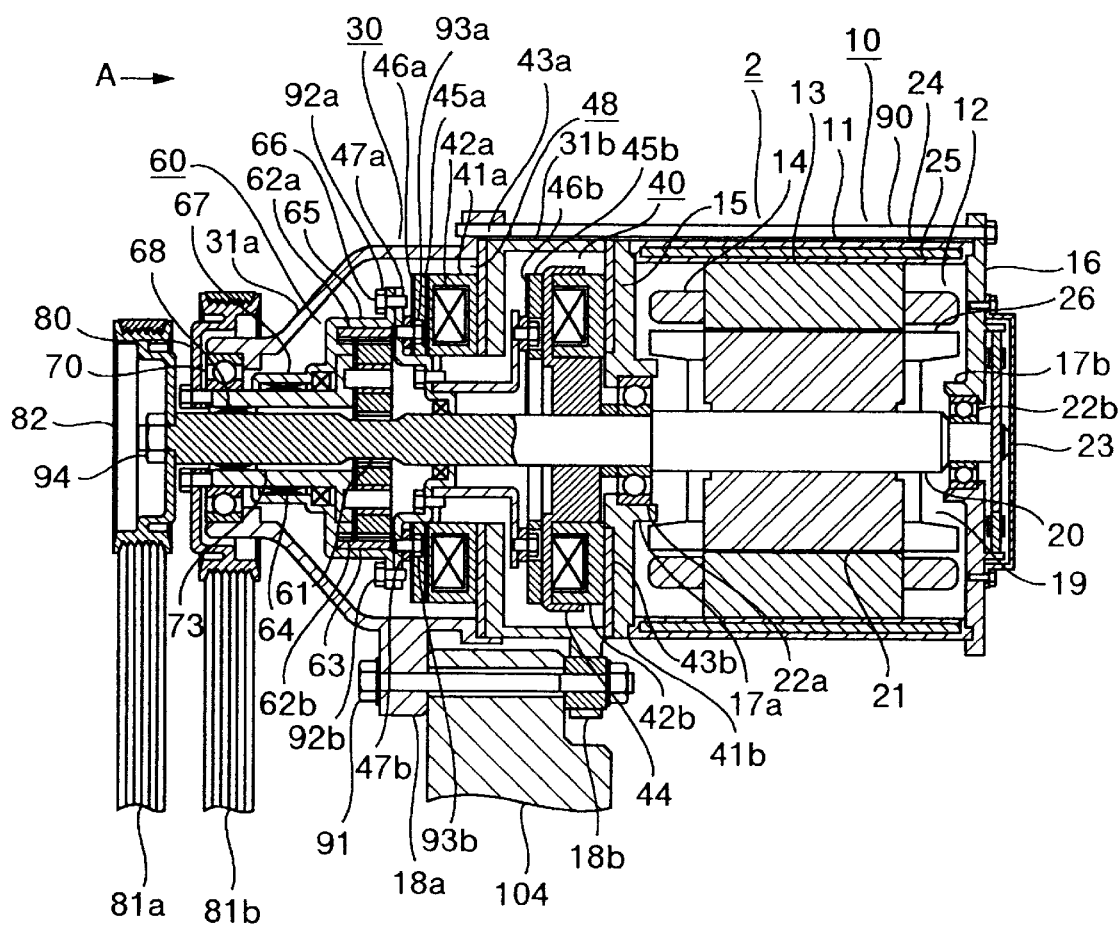
FIG. 6 is a vertical side cross-sectional view of a motor/generator which forms a part of an electric machine for a vehicle in accordance with another embodiment-of the present invention.

Shown in FIG. 6 is a vertical side cross-sectional view of the motor/generator 2 which forms a part of the electric machine 1 of the second embodiment. In the drawing, the same parts as those in FIG. 3 are denoted by the same reference numerals or symbols and explanation thereof is omitted. The motor/generator 2 of the present embodiment is different from the motor/generator 2 shown in FIG. 3 mainly in that an electromagnetic brake 48 is provided as a braking means, that a through-bore 73 is made in the center of the input/output shaft 64 and the rotary shaft 20 is inserted into the bore, that an auxiliary-device driving pulley 82 is tightly secured to an end of the rotary shaft 20 projecting from the pulley 80 by means of the fixing nut 94, and that the one-way clutch 69 is not provided.

The electromagnetic brake 48 is arranged so that a core 41a having a coil 42a wound therearound is fixed to a transmission housing 31b through a mounting plate 43a, an armature 45a is rotatably supported as spaced and kept by a constant distance from the core 41a, and a leaf spring 46a is fixed to an end face of the armature 45a by a fixing bolt (not shown).

The side plate 66 of the transmission 30 is secured to the armature 45a via the spacers 47a, 47b and leaf spring 46a by means of the fixing bolts 93a, 93b, so that the ring gear 63 and armature 45a can rotate as a single unit.

In the motor/generator 2 of the present embodiment, the electromagnetic brake 48 is actuated so that the casing 65 having the ring gear 63 engaged therewith is locked and the planetary gear mechanism 60 functions as a speed retarder in the operational mode ①. More in detail, when a power is supplied to the electromagnetic brake 48 to supply a current to the coil 42a, an electromagnetic force is generated so that the armature 45a is attracted to the core 41a against the spring force of the leaf spring 46a, whereby the armature 45a is locked. As a result, the side plate 66 fixed to the armature 45a is locked and the ring gear 63 engaged with the casing 65 is locked.

That is, in the operational modes other than the mode ①, the ring gear 63 can be rotated in its forward and reverse directions. Thus since the rotational inertia of the input/output shaft 64 is relatively large, even when the rotation of the ring gear 63 is energized in the reverse direction and the engine is in its temporarily stopped state, the motor 10 can be driven as a motor to rotate the rotary shaft 20 in its forward direction. As a result, an auxiliary device (not shown) such as a compressor for an air conditioner, oil pump or the like connected to the rotary shaft 20 via a belt 81a can be driven as in the idling state. This is advantageous from the cost viewpoint in that the need for provision of another motor can be eliminated for driving the auxiliary device.

In this connection, the auxiliary device is not limited to the above example but may be a coolant pump as an example.

Further, if the casing 65 can be fixed, then the disposition of the electromagnetic brake 48 can be arbitrarily determined.

Explanation will next be made as to a hybrid vehicle as an example of the vehicle having the aforementioned electric machine mounted thereon. The hybrid vehicle is driven by the electric machine and an ordinary internal combustion engine.

As ones of such hybrid vehicles, there are known a series type of hybrid vehicle wherein a generator is driven by a driving force of an engine to obtain a power and the power is used to drive a motor coupled to an axle and to run the vehicle, and a parallel type of hybrid vehicle wherein part of a rotating force of an engine is used to obtain a power and a driving force of a motor and the vehicle is run by both driving forces of the motor and engine coupled to an axle.

For example, JP-A-9-132042 discloses an engine and two motors are coupled to shafts of a planetary gear mechanism to distribute a driving force according to the loads and rotational speeds of the engine and motors.

In the above prior art, however, two of the motor and an inverter circuit for driving the motor are required and further a vehicle structure must be modified to newly mount the planetary gear mechanism, which inevitably involves a remarkably increased cost.

In order to avoid it, there is considered a system in which a motor/generator having motor and generator functions is mounted on an engine and its input/output shaft is coupled to a crank shaft. With this arrangement, the single motor/generator can be used both as the motor and as the generator, which is advantageous over the above prior art from the viewpoint of cost.

When the motor/generator is employed, it is preferable that a speed reducer be provided between the motor/generator and crank shaft to cope with an insufficient torque at the time of starting the engine. However, the speed reducer has a problem that, in the generator mode in which the motor/generator is driven by the engine, the rotational speed of the motor/generator is increased by an amount corresponding to its reduction gear ratio.

To avoid this, it is necessary that the speed reducer be disabled at least in the generator mode, to which end such an electric machine 1 as shown in the foregoing embodiments can be mounted.

In accordance with the present invention, the motor/generator is arranged so that the rotary shaft of the motor/generator when functioning as the motor is rotated in the same direction as that when functioning as the generator, or the rotational direction of the rotor when the motor/generator is driven as the motor is set to be the same as the rotational direction of the input/output shaft of the transmission mechanism coupled to the crank shaft when the motor/generator is driven as the generator. As a result, the angular acceleration of the crank shaft when the clutch unit is actuated can be made relatively small and improved riding comfort and stability of the vehicle can be secured.

What is claimed is:

1. A motor/generator apparatus for a vehicle comprising:

an electric machine connected to a crank shaft of an engine and functioning as a motor and as a generator;

a transmission provided between the motor/generator and crank shaft for converting and transmitting driving force generated by the electric machine to the crank shaft; and a switch device for causing the electric machine to function as the motor when the engine is started and for causing the electric machine to function as the generator after the engine is started, wherein said apparatus further comprises an electromagnetic clutch connecting or disconnecting between a rotation shaft of said motor/generator and an input/output shaft of said transmission, and wherein said transmission has a reduction gear ratio more than 1 and a reduction gear ratio of 1, and, when the transmission transmits the driving force from the electric machine to the crank shaft, either one of said reduction gear ratios is selected.

2. A motor/generator apparatus for a vehicle as set forth in claim 1, wherein said transmission is provided as a planetary gear device which includes a sun gear provided in the center thereof, a ring gear provided outside of the sun gear, a plurality of planetary gears provided to mesh with said sun gear and ring gear, and a planet carrier for supporting said plurality of planetary gears, said sun gear is mounted onto the rotary shaft of said electric machine, said planet carrier is provided to an input/output shaft for outputting the driving force from said electric machine to said crank shaft and receiving a driving force from said crank shaft, a one-way clutch for preventing said ring gear from rotating in reverse direction of the rotary shaft of said electric machine, and an electromagnetic clutch is provided as said switch device for performing engagement and disengagement between at least two of said sun gear, ring gear and planet carrier in such a manner that said three gears are rotated as a single unit.

3. A motor/generator apparatus for a vehicle comprising:

an electric machine having motor and generator functions for bi-directionally transmitting a driving force together with a crank shaft of an engine;

an electric machine controller for controlling said electric machine;

a high-voltage battery for performing charging and discharging operation over said electric machine;

a low-voltage battery for supplying a power to an electrical load of the vehicle;

an inverter for performing power conversion between said motor/generator and high-voltage battery; and a DC/DC converter for performing voltage conversion between said high-voltage battery and low-voltage battery, wherein a transmission for transmitting a driving force is provided between said electric machine and crank shaft, said transmission being arranged so that a rotational direction of a rotary shaft of said electric machine when said electric machine is driven as the motor is set to be the same as a rotational direction of an input/output shaft of the transmission.

4. A motor/generator apparatus for a vehicle as set forth n claim 3, wherein said motor/generator includes a stator having a coil wound therein and a rotor having an iron core fitted to its rotary shaft, wherein said transmission includes a planetary gear device having a planet carrier connected to said crank shaft and a sun gear coupled to the rotary shaft of said motor/generator, wherein a rotating member coupled to a ring gear of said planetary gear device is provided to be rotated relatively to said rotor, and a clutch device for performing engagement and disengagement between said rotating member and rotor is provided.

5. A motor/generator apparatus as set forth in claim 4, wherein said controller causes the electric machine to be driven as an electric motor prior to the actuation of said clutch device.

6. A motor/generator apparatus for a vehicle as set forth in claim 3, wherein said electric machine includes a stator having a coil wound therein and a rotor having an iron core fitted to its rotary shaft, wherein said transmission includes a planetary gear device having a planet carrier connected to the rotary shaft of said electric machine, wherein a rotating member coupled to a ring gear of said planetary gear device is provided to be rotated relatively to said rotor, a brake device for releasing and fixing of said rotating member is provided, and a linkage device for connecting said rotor and an auxiliary device of the vehicle is provided to transmit a driving force from said rotor to the auxiliary device.

7. A motor/generator apparatus as set forth in claim 6, wherein said auxiliary device is a compressor or an oil pump.

8. A motor/generator apparatus as set forth in claim 6, wherein said brake device is actuated when said engine is started.

9. A hybrid vehicle having the motor/generator apparatus as set forth in any of claims 1 and 3 mounted thereon.

10. A motor/generator apparatus for a vehicle comprising:

an electric machine connected to a crank shaft of an engine and functioning as a motor and as a generator;

a transmission provided between the motor/generator and crank shaft for converting and transmitting driving force generated by the electric machine to the crank shaft; and a switch device for causing the electric machine to function as the motor when the engine is started and for causing the electric machine to function as the generator after the engine is started, wherein a rotary shaft of the electric machine functioning as the motor is rotated in the same direction as the rotary shaft of the electric machine functioning as the generator, and wherein said transmission is provided as a planetary gear device which includes a sun gear provided in the center thereof, a ring gear provided outside of the sun gear, a plurality of planetary gears provided to mesh with said sun gear and ring gear, and a planet carrier for supporting said plurality of planetary gears, said sun gear is mounted onto the rotary shaft of said electric machine, said planet carrier is provided to an input/output shaft for outputting the driving force from said electric machine to said crank shaft and receiving a driving force from said crank shaft, a one-way clutch for preventing said ring gear from rotating in reverse direction of the rotary shaft of said electric machine, and an electromagnetic clutch is provided as said switch device for performing engagement and disengagement between at least two of said sun gear, ring gear and planet carrier in such a manner that said three gears are rotated as a single unit.

11. A hybrid vehicle having a motor/generator apparatus comprising:

an electric machine connected to a crank shaft of an engine and functioning as a motor and as a generator;

a transmission provided between the motor/generator and crank shaft for converting and transmitting driving force generated by the electric machine to the crank shaft; and a switch device for causing the electric machine to function as the motor when the engine is started and for causing the electric machine to function as the generator after the engine is started, wherein a rotary shaft of the electric machine functioning as the motor is rotated in the same direction as the rotary shaft of the electric machine functioning as the generator.

12. A hybrid vehicle having a motor/generator apparatus comprising:

an electric machine connected to a crank shaft of an engine and functioning as a motor and as a generator;

a transmission provided between the motor/generator and crank shaft for converting and transmitting driving force generated by the electric machine to the crank shaft; and a switch device for causing the electric machine to function as the motor when the engine is started and for causing the electric machine to function as the generator after the engine is started, wherein a rotational-direction of a rotor when said electric machine is driven as the motor is set to be the same as a rotational direction of an input/output shaft of said transmission coupled to said crank shaft when said electric machine is driven as the generator.

* * * * *